US005123636A

United States Patent [19]
Dumler et al.

[11] Patent Number: 5,123,636

[45] Date of Patent: Jun. 23, 1992

[54] LOW-CONTAMINATE WORK SURFACE FOR PROCESSING SEMICONDUCTOR GRADE SILICON

[75] Inventors: Richard C. Dumler, Breckenridge; Matthew J. Stavely, Saginaw, both of Mich.

[73] Assignee: Dow Corning Corporation, Midland, Mich.

[21] Appl. No.: 645,779

[22] Filed: Jan. 25, 1991

[51] Int. Cl.[5] .......... B23Q 3/00

[52] U.S. Cl. .......... 269/15; 269/43; 269/17; 269/71; 269/258; 269/289 R; 269/286

[58] Field of Search .......... 269/37, 43, 45, 71, 269/73, 289 R, 296, 289 MR, 264, 265, 258, 15, 17, 266, 908, 286

[56] References Cited

U.S. PATENT DOCUMENTS 880,948 3/1908 Wilhelm et al. .......... 269/258
2,811,186 10/1957 Honza .......... 269/45
4,473,455 9/1984 Dean et al. .......... 269/903
4,857,173 8/1989 Belk .......... 209/2

FOREIGN PATENT DOCUMENTS 175343 2/1917 Canada .......... 269/289
0139408 1/1980 Fed. Rep. of Germany ... 269/289 R

OTHER PUBLICATIONS

*Materials and Processes in Manufacturing* by E. Paul DeGarmo, 1979, p. 169.

*Primary Examiner*—Bruce M. Kisliuk
*Assistant Examiner*—Eileen Morgan
*Attorney, Agent, or Firm*—William F. Boley

[57] ABSTRACT

The present invention is a low-contaminate work surface for processing semiconductor grade silicon. The work surface is comprised of a parallel array of silicon elements forming a planar surface. The silicon elements are of comparable purity with the semiconductor grade silicon to be process, thus minimizing contact contamination. In an additional embodiment of the present invention, the low-contaminate work surface is part of a work station which provides for initial screening and sizing of the semiconductor grade silicon being processed.

6 Claims, 2 Drawing Sheets

LOW-CONTAMINATE WORK SURFACE FOR PROCESSING SEMICONDUCTOR GRADE SILICON

BACKGROUND OF INVENTION

The present invention is a low-contaminate work surface for processing semiconductor grade silicon. The work surface is comprised of a parallel array of silicon elements forming a planar surface. The silicon elements are of comparable purity with the semiconductor grade silicon to be process, thus minimizing contact contamination. In an additional embodiment of the present invention, the low-contaminate work surface is part of a work station which provides for initial screening and sizing of the semiconductor grade silicon being processed.

The production of high density integrated circuits requires wafers of monocrystalline silicon of high purity. Transitional metal impurities including, among others, copper, gold, iron, cobalt, nickel, chromium, tantalum, zinc, and tungsten, and impurities such as carbon, boron, and phosphorous are particularly harmful. These impurities, even in small quantities, introduce defect sites in semiconductor material which can ultimately result in degraded device performance, and limited circuit density.

Typically, a polycrystalline silicon of high purity is formed by chemical vapor deposition of a high purity chlorosilane gas onto a heated substrate. The resulting product is rods of polycrystalline silicon. The polycrystalline must be further processed to produce a monocrystalline silicon from which silicon wafers can be cut.

A significant portion of the monocrystalline silicon required by the semiconductor industry is produced by the well known process first described by Czochralski. In a typical Czochralski type process, silicon pieces are melted in an appropriate vessel and a silicon seed crystal is used to draw a monocrystalline rod of semiconductor grade silicon from the melt. Control of this crystal growth process requires that the silicon pieces added to the melt containing vessel be within a defined size range. Therefore, it is necessary that the polycrystalline rods formed during the chemical vaporization deposition process be broken into pieces, and that these pieces be sorted into appropriate size distributions.

Belk, U.S. Pat. No. 4,857,173, describes an apparatus and process for separating silicon seed particles from silicon dust and large, heavy silicon particles. The apparatus is a vertically oriented column having an inert gas flowing upward through the column. A mixture of various size particles is dispensed into the central portion of the column such that small dust particles and product size particles are entrained in the flowing gas and heavier particles fall to a receiver at the bottom of the column. The product size particles are captured in a receptacle near the top of the column. Belk states that, when a high purity mixture of particles is classified with the apparatus or by the method of the invention, it is preferable to use a noncontaminating substance for contact with the various sized particles that are classified.

Dumler et al., Co-Pending U.S. Pat. No. 07/513,409, describes a device for separating semiconductor grade silicon pieces by size. The described device is a cylindrical screen, with contact surface of semiconductor grade silicon, rotationally contacted with a means for rotating the cylindrical screen. The screening device minimizes surface contamination of the silicon pieces.

The inventors have found that the work surface on which silicon rods are processed into pieces is also a source of contamination of the silicon pieces. Therefore, what is described herein is a low-contaminate work surface for processing semiconductor grade silicon. The work surface comprises a parallel array of silicon elements forming a planar surface. The silicon elements are formed from silicon of comparable purity to that of the semiconductor silicon to be process so as to avoid contact contamination of the processed silicon. The silicon elements may be arrange so as to provide an initial size screening of the processed silicon.

SUMMARY OF INVENTION

The present invention is a low-contaminate work surface for processing semiconductor grade silicon. The work surface comprises a parallel array of silicon elements forming a planar surface. The silicon elements are of comparable purity with the semiconductor grade silicon to be process, thus minimizing contact contamination of the processed silicon. In an additional embodiment of the present invention, the low-contaminate work surface is part of a work station which provides for initial sizing of the semiconductor grade silicon being processed.

DESCRIPTION OF DRAWINGS

Figure 1:
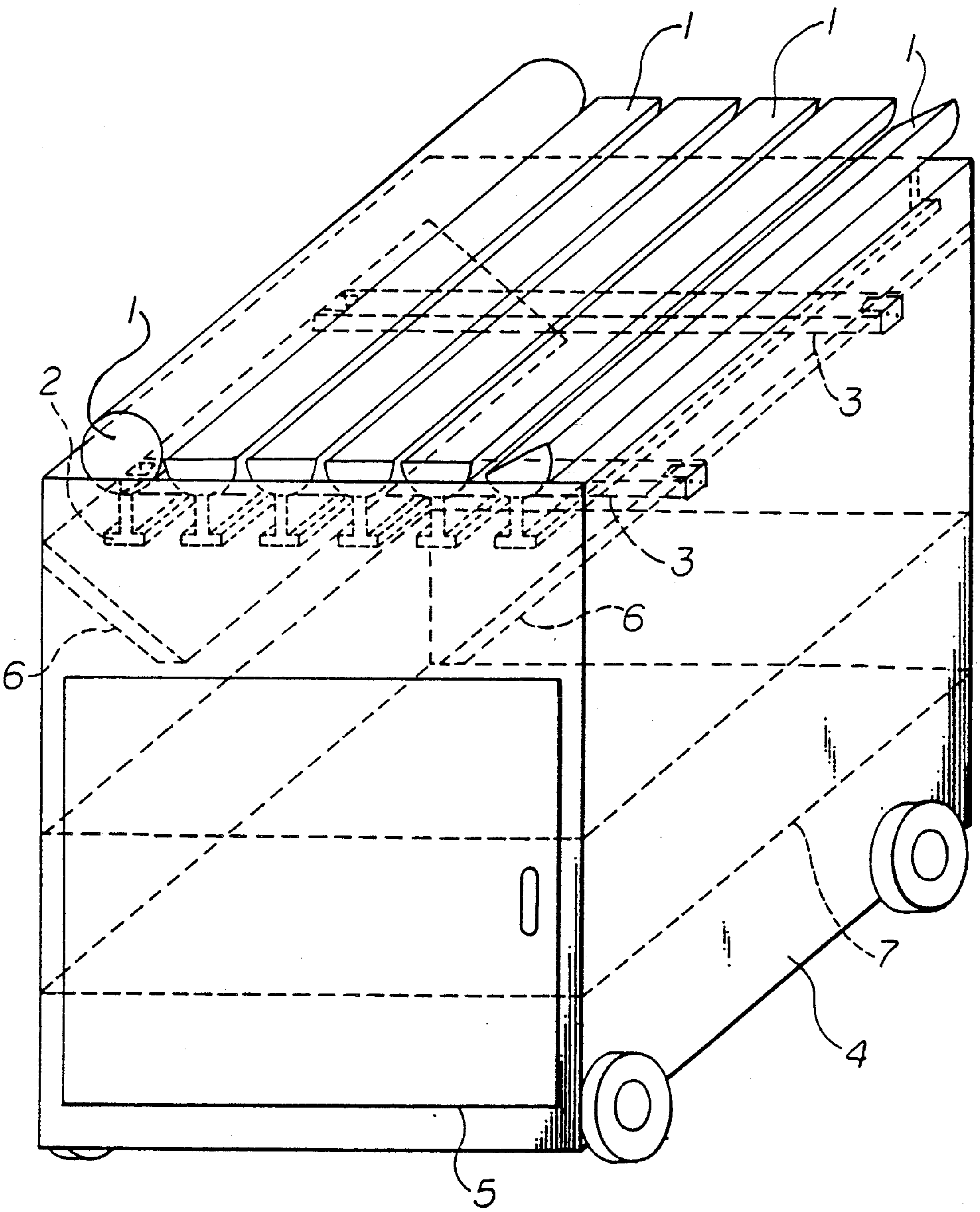
FIG. 1 depicts a work station with a low-contaminate work surface comprising a parallel array of silicon elements maintained in position by adjustable supports.

FIG. 1 depicts a low-contaminate work station for preparing silicon pieces. The work station consists of a low-contaminate work surface formed by a parallel array of silicon elements 1. Each silicon element 1 is maintained in position by means of adjustable support 2. Adjustable support 2 is adjustably mounted on to cross-members 3 which are supported by base 4. Adjustable support 2 allows for gaps to be created between the parallel array of silicon elements. Base 4 is an enclosed stainless steel cabinet having access door 5. Mounted within base 4 is chute 6, which channels semiconductor grade silicon fines and pieces passing through the gaps created between the silicon elements to removeable collection receptacle 7 positioned beneath the parallel array of silicon elements.

Figure 2:
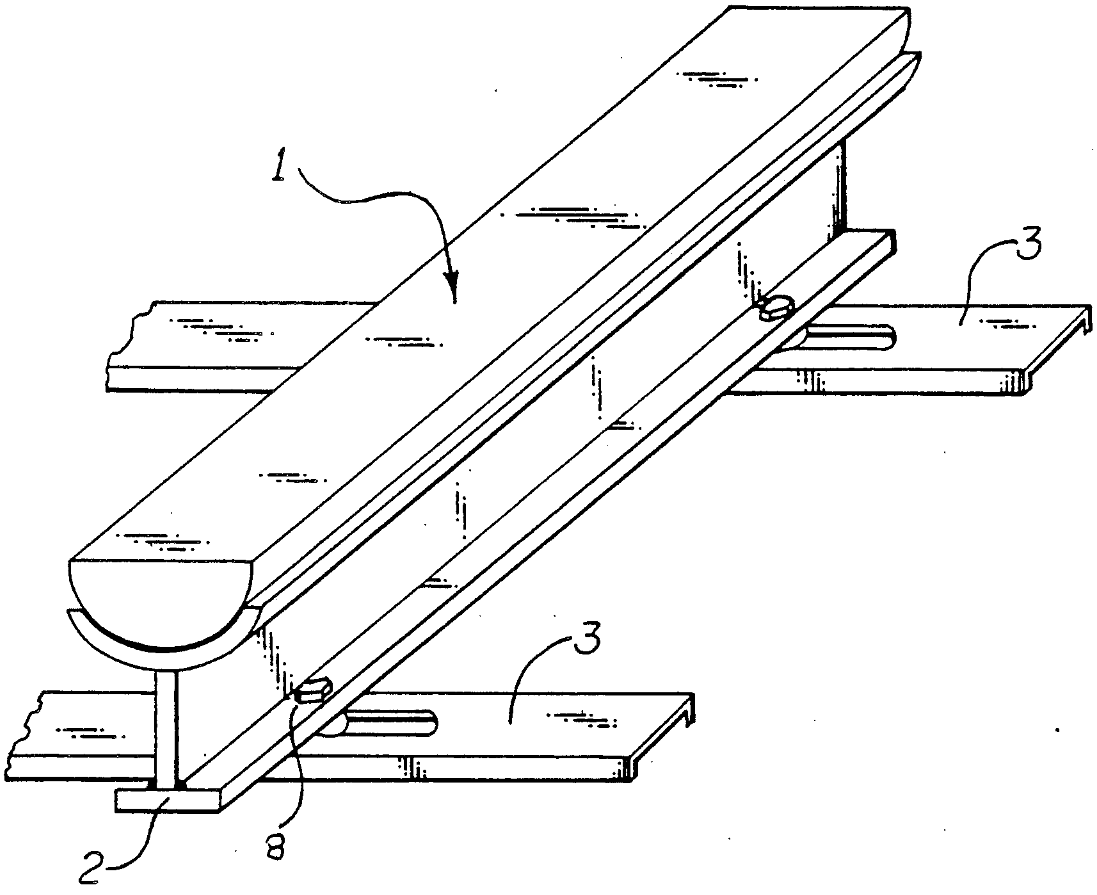
FIG. 2 depicts a configuration of an adjustable support for the silicon elements, the support adjustably mounted on to a cross-member.

FIG. 2 illustrates silicon element 1 contained in moveable support 2 adjustably mounted on cross-beam 3. Moveable support 2 is secured to cross-beam 3 by means of bolt 8 passing through a hole in the base of moveable support 2 and a slot in cross-beam 3. The slot in cross-beam 3 allows moveable support 2 to be moved to create gaps between parallel arrayed silicon elements.

DESCRIPTION OF INVENTION

The present invention is a low-contaminate work surface for processing semiconductor grade silicon. The work surface is comprised of a parallel array of silicon elements forming a planar surface. The position of the silicon elements may be adjusted and maintained by means of adjustable supports. The work surface, with adjustable silicon elements, may be part of a work station for preparing silicon pieces, where the adjustable supports are adjustably mounted on to one or more cross-members supported on a base. The base may contain a collection receptacle positioned beneath the silicon elements.

The basis of the present invention is a work surface that will not significantly contaminate semiconductor grade silicon that contacts the work surface. To avoid contamination of the semiconductor grade silicon by the work surface, the work surface is composed of silicon of comparable or greater purity. In a preferred embodiment, the work surface is fabricated as a parallel array of silicon elements forming a planar surface. The preferred embodiment of the instant invention is particularly useful for a process involving the fragmentation of semiconductor grade silicon into smaller sizes.

The silicon element is formed from silicon. The term "silicon" refers to a metalloid type material comprising greater than 90 percent elemental silicon. Preferred, is when the silicon elements are formed from a metalloid type material comprising greater than 99.99 percent elemental silicon. The silicon forming the silicon elements can be either polycrystalline silicon or monocrystalline silicon. To provide additional strength to the silicon elements, it is preferred that the silicon elements be heat annealed at temperature of 800° C. to 1350° C.

The silicon elements can be formed of solid silicon or can be formed from supports coated with silicon. The silicon elements can be of any shape which allows creation of a planar surface. The silicon elements can be, for example, round rods or square, triangular, or other multifacet rods; or any combination thereof. The silicon elements can be in the form of sheets of silicon. A preferred shape for the silicon elements is that of a rod with a semi-circular cross section. Such a configuration can be formed, for example, by cutting a circular rod of silicon longitudinally in half forming two semicircular rods. The circular rod can be formed, for example, by a chemical vapor deposition process for forming polycrystalline silicon.

The silicon elements can be arranged in any configuration which forms a work surface on which semiconductor silicon material can be supported and processed. Preferred is a work surface comprising a parallel array of silicon elements forming a planar surface. More preferred is a work surface comprising a parallel array of semicircular rods forming a planar surface.

The silicon elements, forming the low-contaminate work surface, can be maintained in position by means of adjustable supports. The silicon elements are brittle and subject to fracture. Therefore, it is preferred that the silicon elements have a support on which they can lay or be partially encased. The support can be fabricated from any material of sufficient strength to provide support to the silicon element. The support material can be, for example, a metal such as steel, stainless steel, or aluminum. The support material can be a synthetic polymer composition such as polyethylene, polypropylene, polycarbonate, polyurethane or teflon. A preferred support material is a metal alloy such as stainless steel. The shape of the support material will depend on the shape of the element to be supported. It is preferred that the support material be in a shape that provides support for the silicon elements without contacting the semiconductor silicon being processed.

In the preferred embodiment of the instant invention, as illustrated in FIG. 2, the support contains a semicircular longitudinal channel which conforms to the shape of a semicircular silicon element.

It is preferred that the supports for the silicon elements be adjustable. By adjustable, it is meant that the supports have a means whereby gaps can be created, modified, and maintained between the parallel silicon elements. The presence of gaps can allow for fines and small fragments of the semiconductor silicon being processed to pass from the work surface to a collection receptacle located beneath the work surface.

The adjustable supports can be adjustably mounted on to one or more cross-members. The cross-members can be fabricated from conventional materials which are adequate to support the weight of the silicon elements and adjustable supports. The cross-member can be for example, a square channel beam as illustrated in FIG. 2. The cross-member can be fabricated from materials similar to those described for the adjustable support. Adjustability of the adjustable supports can be provided for be means of slots or multiple holes in the cross-member. The adjustable supports can be secured to the cross-members by standard means, for example, bolts, screws, rivets, or the like.

The cross-members can be supported on a base. The base can be of conventional design and materials of fabrication. The base can be for example a rectangular or square box on which the cross-members supporting the silicon elements and adjustable supports rest, forming a top thereon. The base could consist of a plurality of legs connected by a top frame on which the cross-members rest. It is preferred that the base be constructed to provide an open central area into which a removable collection receptacle can be positioned to collect semiconductor grade silicon which passes through gaps in the work surface.

The collection receptacle can be of any design sufficient to contain the semiconductor silicon passing through gaps in the work surface. The material of construction of the collection receptacle can be of any material of sufficient strength to contain the screenings. The collection receptacle may be lined with a material such as polyethylene to minimize contamination of the semiconductor grade silicon screens, which may be recovered as a separate product.

To facilitate collection of silicon fines and pieces passing through gaps between the silicon elements, it is useful to have a chute located directly beneath the silicon elements. The chute s function is to channel silicon fines and pieces toward the center of the collection receptacle. thus reducing missing of the collection vessel. The chute can be of any conventional design which channels the silicon fines and pieces toward the center of the collection receptacle. The chute can be constructed of conventional metals and plastics as previously described.

The collected fines and pieces passing through the low-contaminate work station may be collected and used in applications requiring high purity silicon. In this case, it is important that surfaces such as those of the chute and collection receptacle be constructed of or lined with a low-contaminate material such as silicon or polyethylene.

What is claimed is:

1. A low-contaminate work surface for processing semiconductor grade silicon, the work surface comprising:

an array of silicon elements, said array forming a planar surface.

2. A low-contaminate work surface for processing semiconductor grade silicon, the work surface comprising:

a parallel array of silicon elements, said array forming a planar surface, where position of the silicon elements is maintained by means of adjustable supports.

3. A low-contaminate work station according to claim 2, where the adjustable supports are positioned to provide gaps between the parallel array of silicon elements.

4. A low-contaminate work station according to claim 2, where the silicon elements are rods with a semicircular cross section.

5. A low-contaminate work station according to claim 4, where the adjustable support contains a semicircular longitudinal channel which conforms to the shape of the silicon element.

6. A low-contaminate work station for preparing silicon pieces, the work station comprising:

(A) a parallel array of silicon elements forming a planar surface, where position of the silicon elements is maintained by means of adjustable supports;

(B) the adjustable supports are adjustably mounted on to one or more cross-members supported on a base; and (C) the base houses a removable collection receptacle positioned beneath the parallel array of silicon elements.

* * * * *